(12) United States Patent
Dücoffre et al.

(10) Patent No.: US 6,649,672 B1
(45) Date of Patent: Nov. 18, 2003

(54) BINDING AGENTS MODIFIED BY NANOPARTICLES FOR COATING AGENTS AND USE OF THE SAME

(75) Inventors: Volker Dücoffre, Wuppertal (DE); Carmen Flosbach, Wuppertal (DE); Klaus Tännert, Wuppertal (DE); Petra Weidenhammer, München (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/009,382

(22) PCT Filed: May 24, 2000

(86) PCT No.: PCT/EP00/04695

§ 371 (c)(1),
(2), (4) Date: Mar. 20, 2002

(87) PCT Pub. No.: WO00/75244

PCT Pub. Date: Dec. 14, 2000

(30) Foreign Application Priority Data

Jun. 2, 1999 (DE) .......................... 199 25 331

(51) Int. Cl.$^7$ ................................. C08K 9/06

(52) U.S. Cl. ................. 523/212; 523/200; 523/205; 523/216; 525/327.3; 525/533; 528/112

(58) Field of Search ................... 523/200, 205, 523/212, 216; 525/533, 327.3; 528/112

(56) References Cited

U.S. PATENT DOCUMENTS 5,494,954 A * 2/1996 Das ..................... 514/315
5,998,504 A  12/1999 Groth

FOREIGN PATENT DOCUMENTS

| EP | 0492376 A | 1/1992 |
| EP | 0872500 A | 10/1992 |
| EP | 0832947 A | 4/1998 |
| JP | 0819909 0 A | 8/1996 |
| WO | WO 9527012 A | 10/1995 |

\* cited by examiner

*Primary Examiner*—Robert Dawson
*Assistant Examiner*—D. Aylward
(74) *Attorney, Agent, or Firm*—Hilmar L. Fricke

(57) ABSTRACT

Binders suitable for coating compositions, obtainable by reaction of one or more epoxy-functional binders with carboxyl-functional nanoparticles, and coating compositions containing them and the use thereof.

8 Claims, No Drawings

BINDING AGENTS MODIFIED BY NANOPARTICLES FOR COATING AGENTS AND USE OF THE SAME

The invention relates to binders modified with nanoparticles for lacquer systems, to coating compositions containing them and to the use thereof.

Lacquer systems containing nanoparticles are state of the art. The nanoparticles lead to an improved properties profile of the lacquer systems, for example in respect of scratch resistance and resistance to solvents and chemicals. For example, EP-A-0 832 947 describes scratch-resistant clear lacquers based on a binder/crosslinking agent system and nanoparticles having reactive groups at the particle surface. Furthermore, EP-A-0 872 500 describes scratch-resistant coating compositions based on a combination of hydroxy-functional binders with nanoparticles having blocked isocyanate groups at the particle surface. When the coating layers applied from such coating compositions are cured, the nanoparticles are bonded chemically into the coating layer.

Compatibility problems can occur when nanoparticles are incorporated into lacquer systems. For example, in the case of lacquer systems of the prior art containing nanoparticles, inhomogeneous distribution of the nanoparticles in the coating layers applied from such coating compositions is from time to time obtained, or homogeneous distribution of the nanoparticles in the coating compositions as such is difficult, if not completely impossible, from the outset.

The object is to eliminate or largely avoid such compatibility problems in lacquer systems containing nanoparticles.

The object can be achieved by reaction of carboxyl-functional nanoparticles with epoxy-functional binders to give lacquer binders modified with nanoparticles.

The invention accordingly provides binders modified with nanoparticles, which binders are prepared by reacting carboxyl-functional nanoparticles with epoxy-functional binders.

The nanoparticles are conventional particles known to the person skilled in the art having a size in the "nanometer" range, for example having a mean particle size of from 5 to 200 nm, preferably from 10 to 100 nm, which contain carboxyl groups especially at the particle surface. The nanoparticles may be of single-phase structure or have a core/shell structure. Nanoparticles of single-phase structure contain carboxyl groups, especially at the particle surface. In the case of nanoparticles composed of a core and a shell, the carboxyl groups are a constituent of the shell and, optionally, additionally of the core. The acid number of the carboxyl-functional nanoparticles is, for example, from 20 to 200 mg KOH/g. In addition to the carboxyl groups, the nanoparticles may also contain further functional groups that do not interfere with an epoxy/carboxy reaction.

The nanoparticles of single-phase structure are inorganic in nature and have been modified by carboxyl groups and, optionally, further organic radicals. For example, they are element-oxygen networks containing elements from the group aluminium, boron, titanium, zirconium and/or silicon, preferably silicon.

The nanoparticles of single-phase structure are preferably particulate organoaluminium, organoboron, organotitanium, organozirconium and/or organosilicon, particularly preferably organosilicon, polymers (Ia) of the formula $(R_3SiO_{1/2})_w(R_2SiO_{2/2})_x(RSiO_{3/2})_y(SiO_{4/2})_z$, wherein y=from 10 to 100 mol. % and the sum of w, x, y and z is to be 100 mol. %. The radicals R, which may be identical or different, may be, in addition to carboxyl-group-containing radicals, $C_1$–$C_6$-alkyl radicals, especially methyl radicals, alkenyl radicals, such as, for example, vinyl and allyl radicals, aryl radicals, such as, for example, a phenyl radical, or substituted hydrocarbon radicals, such as, for example, mercaptoalkyl, cyanoalkyl, aminoalkyl, acyloxyalkyl, such as 3-(meth)acryloyloxypropyl, and hydroxyalkyl radicals. The carboxyl groups may have been produced, for example, by suitable reaction of suitable radicals R, for example by saponification of cyanoalkyl radicals or by oxidation of suitable radicals R. The carboxyl groups may also be introduced directly during the preparation of the organosilicon polymers (Ia).

The preparation of such organosilicon polymers (Ia) can be carried out, for example, according to a single-step emulsion polymerisation process, for example by adding a monomeric silane $RSi(OR')_3$ or a mixture of monomeric silanes of the type $R_aSi(OR')_{4-a}$, wherein a=0, 1, 2 or 3, to an agitated emulsifier/water mixture. A two-step procedure for the emulsion polymerisation process is also possible, wherein the silanes reacted in the first process step preferably have no carboxyl-group-containing radicals R and the reaction of silanes having carboxyl-group-containing radicals R does not take place until the second process step. R is as defined above. R' represents $C_1$–$C_6$-alkyl radicals, aryl radicals or substituted hydrocarbon radicals. The principle of and details relating to the implementation of such emulsion polymerisation processes are known to the person skilled in the art, for example from EP-A-0 492 376.

In the case of nanoparticles composed of a core and a shell, the core is of inorganic nature and has optionally been modified by further organic radicals. For example, they are element-oxygen networks containing elements from the group aluminium, boron, titanium, zirconium and/or silicon, preferably silicon.

The cores may also be colloidal metallic oxides, with preference being given to colloidal silicon dioxide known to the person skilled in the art, for example in the form of a powder or in the form of a dispersion in an aqueous or other organic solvent.

The cores of nanoparticles composed of a core and a shell are preferably organoaluminium, organoboron, organotitanium, organozirconium and/or organosilicon, particularly preferably organosilicon, polymers (Ib) of the formula $(R''_3SiO_{1/2})_w(R''_2SiO_{2/2})_x(R''SiO_{3/2})_y(SiO_{4/2})_z$, wherein y=from 10 to 100 mol. % and the sum of w, x, y and z is to be 100 mol. %. The radicals R'', which may be identical or different, may be carboxyl-group-containing radicals, $C_1$–$C_6$-alkyl radicals, especially methyl radicals, alkenyl radicals, such as, for example, vinyl and allyl radicals, aryl radicals, such as, for example, a phenyl radical, or substituted hydrocarbon radicals, such as, for example, mercaptoalkyl, cyanoalkyl, aminoalkyl, acyloxyalkyl, such as 3-(meth)acryloyloxypropyl, and hydroxyalkyl radicals. The carboxyl groups may have been produced, for example, by suitable reaction of suitable radicals R'', for example by saponification of cyanoalkyl radicals or by oxidation of suitable radicals R''. The carboxyl groups may also be introduced directly during the preparation of the organosilicon polymers (Ib).

The preparation of such organosilicon polymers (Ib) can be carried out, for example, according to the emulsion polymerisation process, for example by adding a monomeric silane $R''Si(OR')_3$ or a mixture of monomeric silanes of the type $R''_aSi(OR')_{4-a}$, wherein a=0, 1, 2 or 3, to an agitated emulsifier/water mixture. R'' is as defined above. R' represents $C_1$–$C_6$-alkyl radicals, aryl radicals or substituted hydrocarbon radicals. The principle of and details relating to the implementation of such emulsion polymerisation processes are known to the person skilled in the art, for example from EP-A-0 492 376.

In the case of nanoparticles composed of a core and a shell, the cores, for example of type (Ib), are preferably surrounded by a carboxyl-functional (meth)acrylic copolymer. For the preparation of nanoparticles composed of a core and a carboxyl-functional (meth)acrylic copolymer shell, (meth)acrylically unsaturated monomers are subjected to radical polymerisation, for example to emulsion polymerisation, in the presence of the cores, for example in the sense of a graft polymerisation on to the cores. For the introduction of the carboxyl groups into the (meth)acrylic copolymer shell, there are employed or used concomitantly in the polymerisation preferably suitable carboxyl-group-containing unsaturated monomers, such as, for example, acrylic, methacrylic, itaconic, crotonic, isocrotonic, aconitic, maleic and fumaric acid, semi-esters of maleic and fumaric acid as well as carboxyalkyl esters of (meth)acrylic acid, for example beta-carboxyethyl acrylate and adducts of hydroxyalkyl (meth)acrylates with carboxylic anhydrides, such as, for example, phthalic acid mono-2-(meth)acryloyloxy-ethyl ester. The carboxy-functional monomers are generally used together with radically copolymerisable olefinically unsaturated monomers that are different therefrom. The principle of and details relating to the implementation of radical polymerisations, for example emulsion polymerisations, are known to the person skilled in the art.

The carboxy-functional nanoparticles are reacted with epoxy-functional binders.

The epoxy-functional binders suitable for reaction with the carboxy-functional nanoparticles are not subject to any limitations. They may be, for example, epoxy-functional polyesters, epoxy-functional polyurethanes, but preferably epoxy-functional (meth)acrylic copolymers, or alternatively other epoxy-functional polymers, for example epoxidised polybutadiene derivatives, polyglycidyl ethers, for example of bisphenol A. The epoxy-functional polymers have at least one, preferably at least two, epoxy functions in the molecule and a calculated epoxy equivalent weight of, for example, from 150 to 2000, based on solid resin. The number-average molar mass (Mn) is preferably from 200 to 10,000.

The preferred epoxy-functional (meth)acrylic copolymers, especially glycidyl (meth)acrylate copolymers, have number-average molar masses (Mn) of, for example, from 1000 to 10,000, preferably from 2000 to 5000.

The preparation of the epoxy-functional (meth)acrylic copolymers is effected by radical polymerisation, especially solution polymerisation, it is known to the person skilled in the art. In the radical copolymerisation, epoxy-functional, radically polymerisable, olefinically unsaturated monomers (I) and radically copolymerisable comonomers (II) that are different therefrom are used in a weight ratio such that the resulting (meth)acrylic copolymers have a calculated epoxy equivalent weight of from 200 to 1000, preferably from 250 to 700, based on the solids.

It is possible to use as epoxy-functional, radically polymerisable, olefinically unsaturated monomers (I) for the preparation of the epoxy-functional (meth)acrylic copolymers, for example, (meth)allyl glycidyl ether, 3,4-epoxy-1-vinylcyclohexane, epoxycyclohexyl(meth) acrylate, vinyl glycidyl ether, but especially glycidyl(meth) acrylate. The epoxy-functional(meth)acrylic copolymers are preferably glycidyl(meth)acrylate copolymers.

In addition to the epoxy groups, the (meth)acrylic copolymers may contain hydroxyl groups, for example corresponding to a hydroxyl number, based on the solids, of up to 200 mg KOH/g, for example from 40 to 200 mg KOH/g. The hydroxyl groups may originate, for example, from hydroxyl-group-containing comonomers (IIa), for example hydroxyalkyl(meth)acrylates such as, for example, hydroxyethyl(meth)acrylate, hydroxypropyl(meth)acrylates that are isomeric in respect of the position of the hydroxyl group, hydroxybutyl(meth)acrylates and reaction products of (meth)acrylic acid and the glycidyl ester of a carboxylic acid having a tertiary alpha-carbon atom.

In addition to the epoxy-functional, olefinically unsaturated monomers (I) and the optionally present hydroxy-functional comonomers (IIa), the epoxy-functional (meth) acrylic copolymers may contain further radically copolymerisable comonomers (IIb) that are different from (I) and (IIa) and that do not contain in addition to the olefinic double bond any functional groups that have an effect on or interfere with the curing mechanism of the coating compositions according to the invention, especially that do not contain any further functional groups, for example alkyl esters of (meth)acrylic acid that contain, for example, from 1 to 20 carbon atoms or more in the alkyl moiety, such as, for example, methyl(meth)acrylate, ethyl(meth)acrylate, propyl(meth)acrylate, butyl(meth)acrylate, isopropyl(meth) acrylate, isobutyl(meth)acrylate, tert-butyl(meth)acrylate, hexyl(meth)acrylate, (alkyl)cyclohexyl(meth)acrylate, (iso) bornyl(meth)acrylate, 2-ethylhexyl(meth)acrylate, decyl (meth)acrylate, hexadecyl(meth)acrylate, lauryl(meth) acrylate; monovinyl aromatic compounds, such as alpha-methylstyrene, the isomeric methylstyrenes, vinyltoluenes, especially styrene; alkyl esters of maleic, fumaric, tetrahydrophthalic, crotonic, isocrotonic, vinylacetic and itaconic acid, which contain, for example, from 1 to 20 carbon atoms or more in the alkyl moiety.

The carboxy-functional nanoparticles are reacted with epoxy-functional binders, for example, in a weight ratio of from 5 to 30 wt. % nanoparticles to from 70 to 95 wt. % epoxy-functional binder or binder components used to construct the epoxy-functional binder, to form the binders according to the invention. The wt. % are based in each case on the solids. The carboxyl groups of the nanoparticles and the epoxy groups of the epoxy-functional binder may be present, for example, in a ratio of from 2:1 to 1:100. The reaction can take place with partial or complete consumption of the carboxyl groups of the nanoparticles. The reaction can be carried out, for example, at elevated temperatures, for example from 80 to 160° C. Catalysts for the addition reaction of carboxyl group and epoxy group can be used. For example, the reaction between the epoxy-functional binders as such can take place with the carboxy-functional nanoparticles, or the epoxy-functional binders are prepared in the presence of the carboxy-functional nanoparticles, in which case the reaction between the epoxy group and the carboxy group can take place before, during and/or after the actual binder synthesis. The reaction between the epoxy group and the carboxy group can be carried out without a solvent or, preferably, in the presence of an organic solvent.

In addition to the hydroxyl groups formed in the described epoxy/carboxy reaction, the binders according to the invention can contain one or more further functional groups. Such further functional groups may be, for example, epoxy and/or carboxyl groups that were present in excess and/or were not reacted in the described carboxy/epoxy reaction, and/or they are other functional groups, for example further hydroxyl groups, olefinically unsaturated double bonds, for example (meth)acryloyl groups. The further functional groups can originate from the nanoparticles and/or from the epoxy-functional binders used as starting material, or they can be introduced after the preparation of the binders according to the invention.

The binders modified with nanoparticles according to the invention can be used as such as coating compositions, but preferably they are first mixed with further constituents. Accordingly, the invention relates also to coating compositions containing the binders modified with nanoparticles according to the invention.

The coating compositions may be thermoplastic, but preferably thermosetting, and they may be self-crosslinking or crosslink by external means.

Thermoplastic coating compositions do not contain crosslinking agents, nor are they self-crosslinkable. They are, for example, physically drying coating compositions.

Thermosetting coating compositions are preferably produced from the binders according to the invention. In that case, the binders according to the invention are binders having one or more reactive functionalities, which provide the basis for chemical crosslinkability. They may be binders that are self-crosslinking or that crosslink by external means. In the latter case, the coating compositions contain crosslinking agents in addition to the lacquer binders modified with nanoparticles.

The choice of crosslinking agents is dependent on the functional groups contained in the lacquer binders modified with nanoparticles, that is to say the crosslinking agents are so chosen that they have a reactive functionality that is complementary to the functionality of the binders according to the invention, it being possible for the functional groups to react with one another by radical polymerisation and/or with addition and/or condensation. Examples of addition reactions are the ring-opening addition of an epoxy group to a carboxyl group with formation of an ester group and a hydroxyl group, the addition of a hydroxyl group and/or a primary and/or secondary amino group to an isocyanate group with formation of a urethane group and/or a urea group, the addition of a primary and/or secondary amino group and/or a CH-acidic group to an alpha,beta-unsaturated carbonyl group, especially a (meth)acryloyl group, the addition of a primary and/or secondary amino group to an epoxy group. Examples of condensation reactions are the reaction of a hydroxyl group and/or a primary and/or secondary amino group with a blocked isocyanate group with formation of a urethane group and/or a urea group and removal of the blocking agent, the reaction of a hydroxyl group with an N-methylol group with removal of water, the reaction of a hydroxyl group with an N-methylol ether group with removal of the etherifying alcohol, the transesterification reaction of a hydroxyl group with an ester group with removal of the esterifying alcohol, the transurethanisation reaction of a hydroxyl group with a carbamate group with removal of alcohol, the reaction of a carbamate group with an N-methylol ether group with removal of the etherifying alcohol. Provided they are compatible with one another, it is also possible for a plurality of complementary functionalities to be present side by side in a coating composition curable by addition and/or condensation reactions, so that two or more different types of reaction mentioned above by way of example may occur during curing.

Coating compositions that crosslink by external means by radical polymerisation may be thermally or chemically induced radically polymerisable coating compositions. They contain binders modified with nanoparticles according to the invention having radically polymerisable, olefinically unsaturated groups as well as, optionally, further radically copolymerisable components. Examples of such components are prepolymers, such as polymers or oligomers having radically polymerisable, olefinic double bonds, especially (meth)acryloyl groups, in the molecule, for example (meth)acrylic-functional (meth)acrylic copolymers, epoxy resin (meth)acrylates, polyester(meth)acrylates, polyether(meth)acrylates, polyurethane(meth)acrylates, unsaturated polyesters, unsaturated polyurethanes or silicone(meth)acrylates, for example having number-average molar masses (Mn) preferably in the range from 200 to 10,000, particularly preferably from 500 to 3000, and, for example, having on average from 2 to 20, preferably from 3 to 10, radically polymerisable, olefinic double bonds per molecule. There may also be present reactive diluents, that is to say reactive monomers, such as, for example, (meth)acrylic acid and its esters, maleic acid and its semi-esters, vinyl acetate, vinyl ethers, substituted vinyl ureas, ethylene and propylene glycol di(meth)acrylate, 1,3- and 1,4-butanediol di(meth)acrylate, vinyl(meth)acrylate, allyl(meth)acrylate, glycerol tri-, di- and mono-(meth)acrylate, trimethylolpropane tri-, di- and mono-(meth)acrylate, styrene, vinyltoluene, divinylbenzene, pentaerythritol tri- and tetra-(meth)acrylate, di- and tri-propylene glycol di(meth)acrylate, hexanediol di(meth)acrylate. The radically curing systems may contain photoinitiators or thermal radical initiators.

Coating compositions that are curable by addition and/or condensation reactions may be single- or multi-component lacquer systems.

Preferred single- or two-component lacquer systems are those which contain epoxy-functional binders modified with nanoparticles, especially epoxy-functional (meth)acrylic copolymers modified with nanoparticles, in combination with carboxyl-functional crosslinking agents. Carboxyl-functional crosslinking agents are known to the person skilled in the art and do not require further explanation.

Further examples of preferred single- or two-component lacquer systems are those which contain hydroxy-functional (meth)acrylic copolymers, polyester resins and/or polyurethane resins as binders modified with nanoparticles, and triazine-based components, for example tris(alkoxycarbonylamino)triazine, that crosslink with the hydroxyl groups of the binders with formation of ether groups and/or ester groups, aminoplastic resins, especially melamine resins, and/or transesterifying crosslinking agents and/or free or blocked polyisocyanates as crosslinking agents. Such crosslinking agents are known to the person skilled in the art and do not require further explanation.

In addition to the binders modified with nanoparticles, the coating compositions according to the invention can contain further binders conventionally employed in lacquers, which further binders can optionally be provided with reactive groups, especially with the same reactive groups as the binders modified with nanoparticles.

For example, the weight ratios of the solids in the coating compositions according to the invention, which ratios total 100 wt. %, are from 60 to 100 wt. % binders modified with nanoparticles to from 0 to 40 wt. % crosslinking agents to from 0 to 40 wt. % further binders.

The coating compositions according to the invention can contain pigments and/or fillers, as well as additives conventionally employed in lacquers, in the amounts conventional in lacquers.

The coating compositions according to the invention can be formulated without a solvent, or they contain organic solvents conventionally employed in lacquers, and/or water. Aqueous coating compositions may be present, for example, in the form of an emulsion. The emulsified state can be achieved by the addition of external emulsifiers, or the systems in question contain groups, for example ionic groups, having a self-emulsifying action in water.

The coating compositions according to the invention can be used to produce any desired coating layers, for example to produce primer, base lacquer, surfacer, finishing lacquer, clear lacquer layers. They can be applied by conventional application methods to any desired substrates, for example of metal, plastics, wood, glass. Examples of application methods are spread-coating, roller coating, blade coating, dip-coating, but especially spraying. After application, and after an optional phase of exposure to air or melting, the coating layers applied from the coating compositions according to the invention are dried or cured. Depending on the composition of the coating compositions according to the invention, drying or curing can take place at room temperature or can be forced at elevated temperatures, for example from 40 to 80° C., or can be effected by stoving at higher temperatures, for example from 80 to 220° C. In the case of radiation-curable coating compositions according to the invention, curing takes place under the action of high-energy radiation, for example UV radiation.

The binders modified with nanoparticles according to the invention do not exhibit any compatibility problems between the nanoparticles and further constituents of the binders, or of the coating compositions, either during their production or storage, during or after their incorporation into coating compositions, or during or after application of the coating compositions. The binders and coating compositions are stable to storage. The coating layers applied from the coating compositions according to the invention have, for example, very good surface properties, especially, for example, high scratch resistance and resistance to chemicals.

EXAMPLE 1

A mixture of 400 g of butyl diglycol and 122 g of carboxyl-functionalised nanoparticles based on a silicon-oxygen network (particle size 15 nm, acid number 90 mg KOH/g) is heated to 146° C., and a mixture of 28 g of glycidyl methacrylate, 200 g of 1,4-butanediol monoacrylate, 113 g of isobutyl acrylate, 113 g of styrene, 21 g of tert-butyl per-2-ethylhexanoate and 3 g of di-tert-butyl peroxide is added dropwise over a period of 4 hours. Polymerisation is then carried out for 4 hours.

EXAMPLE 2

400 g of butyl diglycol are heated to 146° C., and a mixture of 28 g of hydroxypropyl methacrylate, 200 g of 1,4-butanediol monoacrylate, 174 g of isobutyl acrylate, 174 g of styrene, 21 g of tert-butyl per-2-ethylhexanoate and 3 g of di-tert-butyl peroxide is added dropwise over a period of 4 hours. Polymerisation is then carried out for 4 hours.

EXAMPLE 3

Production of a base lacquer/clear lacquer two-layer lacquer coating:

A black water-borne lacquer is applied by spraying in a dry layer thickness of 15 μm to a conventional motor vehicle body sheet which has been phosphated and pre-coated by cathodic electro-dipcoating and with surfacer. After the application the lacquer coating is pre-dried for 5 minutes at 80° C. It is then covered with a clear lacquer, prepared as follows, in a dry layer thickness of 35 μm and stoved for 20 minutes at 140° C. (object temperature).

The clear lacquer (DIN4 spray viscosity at 20° C. of 30 seconds) is prepared by mixing 132 g of the resin solution obtained in Example 1 with 48 g of butyl diglycol, 66 g of n-butanol, 2.3 g of a 4 wt. % solution of para-toluenesulfonic acid in isopropanol, 40 g of methoxypropanol and 40 g of a 50 wt. % solution of a trisalkoxycarbonylaminotriazine crosslinking agent (Cylink 2000 from Cytec) in butanol.

EXAMPLE 4

Production of a base lacquer/clear lacquer two-layer lacquer coating:

Example 3 is repeated, but the clear lacquer (DIN4 spray viscosity at 20° C. of 30 seconds) is prepared by mixing 132 g of the resin solution obtained in Example 2 with 20 g of n-butanol, 2.3 g of a 4 wt. % solution of para-toluenesulfonic acid in isopropanol, 20 g of methoxypropanol and 40 g of a 50 wt. % solution of a trisalkoxycarbonylaminotriazine crosslinking agent (Cylink 2000 from Cytec) in butanol.

EXAMPLE 5

An attempt to incorporate nanoparticles as used in Example 1 into a clear lacquer prepared according to Example 4 by subsequent addition is unsuccessful. Incompatibility phenomena occur.

The scratch resistance of the lacquer coatings obtained in Examples 3 and 4 is determined by measuring the residual gloss after scratching by washing (Example 3, residual gloss 84%; Example 4, residual gloss 74%).

The residual gloss is measured in % (ratio of the initial gloss (20°) of the lacquer coating to its gloss after scratching by washing, gloss measurement in each case at an angle of illumination of 20°). The scratching by washing is carried out using the laboratory wash line from Amtec Kistler (see Th. Klimmasch and Th. Engbert, Entwicklung einer einheitlichen Laborprüfmethode für die Beurteilung der Waschstrassenbeständigkeit von Automobil-Decklacken [Development of a standard laboratory test method for evaluating the wash-line resistance of automotive finishing lacquers], in DFO-Berichtsband 32, pages 59 to 66, Technologie-Tage, report of the seminar on Apr. 29th and 30th 1997 in Cologne, eds. Deutsche Forschungsgesellschaft für Oberflächenbehandlung e.V., Adersstrasse 94, 40215 Düsseldorf).

We claim:

1. A binder for a coating composition comprising at least one epoxy-functional binder reacted with carboxy-functional nanoparticles, wherein the nanoparticles are selected from the group consisting of single-phase inorganic nanoparticles modified with carboxyl groups and nanoparticles having a core/shell structure with an inorganic core.

2. The binder according to claim 1, wherein the nanoparticles have a mean particle size from 5 to 200 nm.

3. The binder according to claim 2, wherein 5 to 30 wt. % of carboxyl-functional nanoparticles are reacted with 70 to 95 wt. % of epoxy-functional binder.

4. The binder according to claim 3, wherein the carboxyl groups of the carboxyl-functional nanoparticles and the epoxy groups of the epoxy-functional binder are present in a ratio from 2:1 to 1:100.

5. The binder according to claim 1, wherein the epoxy-functional binder is selected from the group consisting of epoxy-functional polyesters, epoxy-functional polyurethanes, epoxy-functional (meth)acrylic copolymers, epoxidized polybutadienes and polyglycidyl ethers and wherein the epoxy-functional binder has at least two epoxy functional groups and a calculated epoxy equivalent weight of 150 to 2000 based on solid resin and a number-average molar mass of 200–10,000.

6. The binder according to claim 1 wherein the carboxyl-functional nanoparticles comprise a single phase structure selected from the group consisting of organoaluminum, organoboron, organotitanium, organozirconium, organosilicon and combinations thereof.

7. A coating composition comprising the binder according to claim 1.

8. A coating composition comprising the binder according to claim 4.

* * * * *